(12) United States Patent
Mitsui (10) Patent No.: US 10,150,498 B2
(45) Date of Patent: Dec. 11, 2018

(54) STEERING SYSTEM

(71) Applicant: JTEKT CORPORATION, Osaka-shi, Osaka (JP)

(72) Inventor: Kuniaki Mitsui, Kyoto (JP)

(73) Assignee: JTEKT CORPORATION, Osaka (JP)

( * ) Notice: Subject to any disclaimer, the term of this patent is extended or adjusted under 35 U.S.C. 154(b) by 7 days.

(21) Appl. No.: 15/667,728

(22) Filed: Aug. 3, 2017

(65) Prior Publication Data

US 2018/0043922 A1    Feb. 15, 2018

(30) Foreign Application Priority Data

Aug. 10, 2016 (JP) ................................ 2016-158064
Jan. 6, 2017 (JP) ................................ 2017-001003

(51) Int. Cl.
| | | |
|---|---|---|
| B62D 1/00 | (2006.01) | |
| B62D 1/16 | (2006.01) | |
| F16H 55/28 | (2006.01) | |
| B62D 5/04 | (2006.01) | |
| B62D 6/10 | (2006.01) | |
| B62D 6/00 | (2006.01) | |
| B62D 3/12 | (2006.01) | |

(52) U.S. Cl.
CPC ........... B62D 1/166 (2013.01); F16H 55/283 (2013.01); B62D 3/12 (2013.01); B62D 5/04 (2013.01); B62D 5/0463 (2013.01); B62D 6/00 (2013.01); B62D 6/10 (2013.01)

(58) Field of Classification Search
CPC . B62D 1/166; B62D 3/12; B62D 6/10; B62D 5/04; B62D 5/0463; B62D 6/00; F16H 55/283
See application file for complete search history.

(56) References Cited

U.S. PATENT DOCUMENTS

| | | | | |
|---|---|---|---|---|
| 2006/0042863 | A1* | 3/2006 | Yamazaki | ............... B62D 3/12 180/444 |
| 2008/0223163 | A1* | 9/2008 | Yamazaki | ............... B62D 3/12 74/422 |
| 2016/0273641 | A1* | 9/2016 | Mitsui | ................... B62D 3/126 |

FOREIGN PATENT DOCUMENTS

| | | |
|---|---|---|
| DE | 2223527 A1 | 11/1972 |
| DE | 102006061501 A1 | 6/2008 |
| DE | 102011006816 A1 | 10/2012 |

(Continued)

OTHER PUBLICATIONS

Dec. 22, 2017 Extended European Search Report issued in Patent Application No. 17185355.9.

*Primary Examiner* — Kevin Hurley
*Assistant Examiner* — Marlon A Arce
(74) *Attorney, Agent, or Firm* — Oliff PLC (57) ABSTRACT

A ratio of the distance by which a rack shaft moves in a first direction relative to the angle by which a pinion shaft rotates in a circumferential direction is defined as a stroke ratio. The stroke ratio is larger when the pinion meshes with one of a third rack and a fifth rack than when the pinion meshes with a first rack. The stroke ratio changes while the pinion moves on one of a second rack and a fourth rack. A clearance defined between a rack guide and a guide plug is smaller when the pinion meshes with one of the third rack and the fifth rack than when the pinion meshes with the first rack. The clearance defined between the rack guide and the guide plug changes while the pinion moves on one of the second rack and the fourth rack.

4 Claims, 7 Drawing Sheets

(56) References Cited

FOREIGN PATENT DOCUMENTS

| GB | 977434 A | 12/1964 |
|----|----------|---------|
| GB | 2169567 A | 7/1986 |
| JP | S51-091535 A | 8/1976 |
| JP | 2005-088702 A | 4/2005 |

* cited by examiner

STEERING SYSTEM

INCORPORATION BY REFERENCE

The disclosure of Japanese Patent Application No. 2016-158064 filed on Aug. 10, 2016 and No. 2017-001003 filed on Jan. 6, 2017 including the specification, drawings and abstract, is incorporated herein by reference in its entirety.

BACKGROUND OF THE INVENTION

1. Field of the Invention

The invention relates to steering systems and, in particular, relates to a rack-and-pinion steering system.

2. Description of Related Art

Vehicles are provided with a steering system for changing their direction of travel. One example of such a steering system is a rack-and-pinion steering system.

The rack-and-pinion steering system includes a pinion shaft and a rack shaft. The pinion shaft has a pinion. The pinion meshes with a rack of the rack shaft. The rack has multiple rack teeth aligned in the axial direction of the rack shaft. The pinion shaft is coupled to a steering shaft. The steering shaft is coupled to a steering wheel. The rack shaft is coupled to steered wheels of a vehicle via tie rods and kingpins.

In the rack-and-pinion steering system, the steering shaft rotates with rotation of the steering wheel. When the steering shaft rotates, the pinion shaft rotates accordingly. The rack shaft slides as the pinion shaft rotates. Thus, steered wheels of the vehicle are steered, so that the direction of travel of the vehicle is changed.

As described in Japanese Patent Application Publication No. 2005-88702 (JP 2005-88702 A), some rack-and-pinion steering systems are structured to change a ratio of the distance by which the rack shaft moves relative to the angle by which the pinion shaft rotates. This ratio is hereinafter referred to as a "stroke ratio". The stroke ratio is set as appropriate according to required characteristics. For example, one approach may be to set the stroke ratio such that the stroke ratio is small in a middle portion of the rack in a direction that the rack teeth are aligned in and such that the stroke ratio is large in an end portion of the rack in the direction in which the rack teeth are aligned. Further, at an intermediate portion of the rack located between the middle portion and the end portion in the direction in which the rack teeth are aligned, the stroke ratio may increase in a direction from the middle portion toward the end portion. This approach allows the vehicle to travel straight more stably with the pinion meshing with the middle portion of the rack, i.e., with the steering wheel hardly operated.

In the rack-and-pinion steering system, the rack shaft is pressed against the pinion shaft by the biasing force of a coil spring. Thus, the rack meshes with the pinion reliably.

When the pinion meshes with the rack, a pinion tooth of the pinion touches a tooth flank of the rack teeth. A force from the pinion acts in a direction perpendicular to the tooth flank of the rack teeth. The biasing force of the coil spring acts in the height direction of the rack teeth. The biasing force of the coil spring acts as a resistive force to interfere with rotation of the pinion. Setting the magnitude of a component of the force from the pinion in the direction in which the biasing force of the coil spring acts equal to the magnitude of the biasing force of the coil spring allows the pinion to rotate.

The magnitude of the component of the force from the pinion in the direction in which the biasing force of the coil spring acts changes in accordance with a pressure angle of the rack teeth. Therefore, the magnitude of the component of the force from the pinion in the direction in which the biasing force of the coil spring acts is set equal to the magnitude of the biasing force of the coil spring. To achieve this, it is necessary to change the force from the pinion in accordance with the pressure angle of the rack teeth. Accordingly, a torque required when the pinion starts rotating changes in accordance with the pressure angle of the rack teeth.

There is a relationship between the pressure angle of the rack teeth and the stroke ratio. Specifically, when the stroke ratio is small, the pressure angle of the rack teeth is small. When the stroke ratio is large, the pressure angle of the rack teeth is large.

When the stroke ratio is set in a manner described above, the rack teeth of the rack have different pressure angles. Thus, the torque required when the pinion starts rotating changes in accordance with where the pinion is positioned relative to the rack in the direction in which the rack teeth are aligned when the pinion starts rotating. Accordingly, a force (an initial operating force) required to start operating the steering wheel changes in accordance with where the steering wheel is positioned (i.e., in accordance with how much angle the steering wheel is turned from its initial position) when the steering wheel starts to be operated.

SUMMARY OF THE INVENTION

A purpose of the invention is to equalize a torque required when a pinion meshing with a rack starts rotating in a rack-and-pinion steering system, regardless of which portion of the rack the pinion meshes with.

An aspect of the invention provides a steering system including a rack shaft, a pinion shaft, a rack guide, a housing, a guide plug, and a biasing member. The rack shaft extends in a first direction and has opposite first and second ends in the first direction. The rack shaft has a rack. The rack has multiple rack teeth. The rack teeth are aligned in the first direction. The pinion shaft extends in a second direction. The second direction intersects with the first direction. The pinion shaft has a pinion. The pinion meshes with the rack. The rack guide touches the rack shaft in a third direction. The third direction is perpendicular to each of the first direction and the second direction. The housing accommodates the rack guide. The guide plug is located opposite the rack shaft across the rack guide in the third direction. The guide plug is fixed to the housing. The biasing member is located between the rack guide and the guide plug in the third direction. The biasing member provides the rack guide with a biasing force that presses the rack guide against the rack shaft. The rack guide and the guide plug define a clearance therebetween in the third direction. The biasing force provided by the biasing member increases as the clearance becomes smaller. The rack includes a first rack, a second rack, a third rack, a fourth rack, and a fifth rack. The first rack is formed in a middle portion of the rack in the first direction. The second rack is located closer to the first end of the rack shaft than the first rack in the first direction. The second rack is formed next to the first rack. The third rack is located closer to the first end of the rack shaft than the second rack in the first direction. The third rack is formed next to the second rack. The fourth rack is located closer to the second end of the rack shaft than the first rack in the first direction. The fourth rack is formed next to the first rack. The fifth rack is located closer to the second end of the rack shaft than the fourth rack in the first direction. The fifth rack is formed next to the fourth rack. The pinion shaft is placed to be rotatable in a circumferential direction around a central axis extending in the second direction. As the pinion shaft rotates in one of two opposite directions along the circumferential direction, the rack shaft moves in one of two opposite directions along the first direction. As the pinion shaft rotates in the other of the two opposite directions along the circumferential direction, the rack shaft moves in the other of the two opposite directions along the first direction. A ratio of the distance by which the rack shaft moves in the first direction relative to the angle by which the pinion shaft rotates in the circumferential direction is defined as a stroke ratio. The stroke ratio is larger when the pinion meshes with one of the third rack and the fifth rack than when the pinion meshes with the first rack. The stroke ratio changes while the pinion moves on one of the second rack and the fourth rack. The clearance defined between the rack guide and the guide plug is smaller when the pinion meshes with one of the third rack and the fifth rack than when the pinion meshes with the first rack. The clearance defined between the rack guide and the guide plug changes while the pinion moves on one of the second rack and the fourth rack.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A steering system according to an embodiment of the invention includes a rack shaft, a pinion shaft, a rack guide, a housing, a guide plug, and a biasing member. The rack shaft extends in a first direction and has opposite first and second ends in the first direction. The rack shaft includes a rack. The rack has multiple rack teeth. The rack teeth are aligned in the first direction. The pinion shaft extends in a second direction. The second direction intersects with the first direction. The pinion shaft has a pinion. The pinion meshes with the rack. The rack guide touches the rack shaft in a third direction. The third direction is perpendicular to each of the first direction and the second direction. The housing accommodates the rack guide. The guide plug is located opposite the rack shaft across the rack guide in the third direction. The guide plug is fixed to the housing. The biasing member is located between the rack guide and the guide plug in the third direction. The biasing member provides the rack guide with a biasing force that presses the rack guide against the rack shaft. The rack guide and the guide plug define a clearance therebetween in the third direction. The biasing force provided by the biasing member increases as the clearance becomes smaller. The rack includes a first rack, a second rack, a third rack, a fourth rack, and a fifth rack. The first rack is formed in a middle portion of the rack in the first direction. The second rack is located closer to the first end of the rack shaft than the first rack in the first direction. The second rack is formed next to the first rack. The third rack is located closer to the first end of the rack shaft than the second rack in the first direction. The third rack is formed next to the second rack. The fourth rack is located closer to the second end of the rack shaft than the first rack in the first direction. The fourth rack is formed next to the first rack. The fifth rack is located closer to the second end of the rack shaft than the fourth rack in the first direction. The fifth rack is formed next to the fourth rack. The pinion shaft is placed to be rotatable in a circumferential direction around a central axis extending in the second direction. When the pinion shaft rotates in one of two opposite directions along the circumferential direction, the rack shaft moves in one of two opposite directions along the first direction. When the pinion shaft rotates in the other of the two opposite directions along the circumferential direction, the rack shaft moves in the other of the two opposite directions along the first direction. A ratio of the distance by which the rack shaft moves in the first direction relative to the angle by which the pinion shaft rotates in the circumferential direction is defined as a stroke ratio. The stroke ratio is larger when the pinion meshes with one of the third rack and the fifth rack than when the pinion meshes with the first rack. The stroke ratio changes while the pinion moves on one of the second rack and the fourth rack. The clearance defined between the rack guide and the guide plug is smaller when the pinion meshes with one of the third rack and the fifth rack than when the pinion meshes with the first rack. The clearance defined between the rack guide and the guide plug changes while the pinion moves on one of the second rack and the fourth rack.

In the steering system, the biasing force provided by the biasing member changes in accordance with size of the clearance defined between the rack guide and the guide plug. Specifically, the biasing force increases as the clearance becomes smaller.

The clearance is smaller when the pinion meshes with one of the third rack and the fifth rack than when the pinion meshes with the first rack. Thus, the biasing force provided by the biasing member is larger when the pinion meshes with one of the third rack and the fifth rack than when the pinion meshes with the first rack.

The stroke ratio is larger when the pinion meshes with one of the third rack and the fifth rack than when the pinion meshes with the first rack. Thus, a pressure angle of the rack teeth of the first rack is smaller than a pressure angle of the rack teeth of each of the third rack and the fifth rack.

The pressure angle of the rack teeth has an influence on the torque required when the pinion starts rotating. This is because, in order to set the magnitude of a component of a force from the pinion in a direction in which the biasing force provided by the biasing member acts equal to the magnitude of the biasing force provided by the biasing member, it is necessary to adjust the force from the pinion in accordance with the pressure angle of the rack teeth. For example, assuming that the biasing force of the biasing member remains unchanged, as the pressure angle of the rack teeth becomes smaller, more force from the pinion is required.

In the steering system, when the pinion meshes with the first rack, i.e., when the pressure angle of the rack teeth is small, the biasing force provided by the biasing member is small. Since the magnitude of the component of the force from the pinion in the direction in which the biasing force provided by the biasing member acts is set equal to the magnitude of the biasing force provided by the biasing member, the force from the pinion becomes small accordingly. Thus, the torque required when the pinion starts rotating becomes small.

In the steering system, when the pinion meshes with one of the third rack and the fifth rack, i.e., when the pressure angle of the rack teeth is large, the biasing force provided by the biasing member is large. Since the magnitude of the component of the force from the pinion in the direction in which the biasing force provided by the biasing member acts is set equal to the magnitude of the biasing force provided by the biasing member, the force from the pinion becomes large accordingly. Thus, the torque required when the pinion starts rotating becomes large. As such, setting the pressure angle of the rack teeth and the magnitude of the biasing force provided by the biasing member as appropriate allows a torque required when the pinion meshing with one of the third rack and the fifth rack starts rotating substantially to be equal to a torque required when the pinion meshing with the first rack starts rotating. Alternatively, this may reduce a difference, to the extent that the difference is unrecognizable to a driver, between the torque required when the pinion meshing with one of the third rack and the fifth rack starts rotating and the torque required when the pinion meshing with the first rack starts rotating.

In the steering system, when the pinion meshes with one of the second rack and the fourth rack, the stroke ratio changes in accordance with which portion of the one of the second rack and the fourth rack the pinion meshes with. In other words, the pressure angle of the rack teeth changes. The magnitude of the biasing force provided by the biasing member changes accordingly. Therefore, the biasing force of the biasing member is set as appropriate in accordance with which portion of the rack the pinion meshes with. This allows the torque required when the pinion meshing with one of the second rack and the fourth rack starts rotating substantially to be equal to the torque required when the pinion meshing with one of the first rack, the third rack, and the fifth rack starts rotating. Alternatively, this may reduce a difference, to the extent that the difference is unrecognizable to a driver, between the torque required when the pinion meshing with one of the second rack and the fourth rack starts rotating and the torque required when the pinion meshing with one of the first rack, the third rack, and the fifth rack starts rotating.

Thus, the steering system makes it possible to substantially equalize the torque required when the pinion starts rotating, regardless of which portion of the rack the pinion meshes with.

In the case of vehicles provided with a power steering system for assisting a driver in turning a steering wheel, the torque required when the pinion starts rotating refers to a torque required before the power steering system works.

A rate of change in the stroke ratio when the pinion moves on the rack is represented, for example, by the absolute value of the ratio of the distance by which the rack shaft moves in the first direction relative to the angle by which the pinion shaft rotates in the circumferential direction. The rate of change in the stroke ratio may be zero when the pinion moves on one of the first rack, the third rack, and the fifth rack. In other words, the stroke ratio may be constant when the pinion moves on one of the first rack, the third rack, and the fifth rack. It is preferable that the rate of change in the stroke ratio when the pinion moves on the rack be larger when the pinion moves on one of the second rack and the fourth rack than when the pinion moves on one of the first rack, the third rack, and the fifth rack.

A rate of change in the clearance when the pinion moves on the rack is represented, for example, by the absolute value of a ratio of the amount by which the clearance changes in size relative to the angle by which the pinion shaft rotates in the circumferential direction. The rate of change in the clearance may be zero when the pinion moves on one of the first rack, the third rack, and the fifth rack. In other words, size of the clearance may be constant when the pinion moves on one of the first rack, the third rack, and the fifth rack. It is preferable that the rate of change in the clearance while the pinion moves on the rack be larger when the pinion moves on one of the second rack and the fourth rack than when the pinion moves on one of the first rack, the third rack, and the fifth rack.

The size of the clearance defined between the rack guide and the guide plug may be adjusted, for example, by adjusting the height of the rack teeth or by adjusting the thickness of a portion of the rack shaft where the rack teeth are formed.

Any member that provides a biasing force changing in accordance with the size of the clearance defined between the rack guide and the guide plug can be used as the biasing member. For example, the biasing member may be a coil spring or a disc spring.

The lengths of the first to fifth racks in the first direction are set as appropriate according to required steering characteristics. The second rack may preferably have the same length as the fourth rack. The third rack may preferably have the same length as the fifth rack.

The stroke ratios of the first to fifth racks are set as appropriate according to required steering characteristics. The third rack may preferably have the same stroke ratio as the fifth rack. The second rack may preferably have the same rate of change in the stroke ratio as the fourth rack.

In the steering system, at each of the third rack and the fifth rack, a profile shift and the pressure angle of the rack teeth are larger at a location closer to a corresponding end of the rack shaft than at a location closer to the middle of the rack shaft in the first direction. Thus, at the third rack and the fifth rack, the size of the clearance defined between the rack guide and the guide plug is substantially constant, regardless of where the pinion is positioned. The reason is as follows.

The rack shaft is manufactured, for example, by forging. When the rack shaft is manufactured by forging, a mold having molding cavities for forming the rack teeth is used. At each of the third rack and the fifth rack, the filling rate of a molding material into the molding cavities for forming the rack teeth is less at a location closer to the corresponding end of the rack shaft than at a location closer to the middle of the rack shaft in the length direction of the rack shaft (i.e., in the first direction). Accordingly, at each of the third rack and the fifth rack, the rack teeth are smaller at a location closer to the corresponding end of the rack shaft than at a location closer to the middle of the rack shaft in the length direction of the rack shaft (i.e., in the first direction). As a result, at each of the third rack and the fifth rack, the clearance defined between the rack guide and the guide plug is larger when the pinion meshes with the rack teeth located closer to the corresponding end of the rack shaft in the length direction of the rack shaft (i.e., in the first direction) than when the pinion meshes with the rack teeth located closer to the middle of the rack shaft in the length direction of the rack shaft (i.e., in the first direction).

Therefore, in the mold used to manufacture the rack shaft by forging, at a portion corresponding to each of the third rack and the fifth rack, the molding cavities for forming the rack teeth located closer to the corresponding end of the rack shaft in the length direction of the rack shaft (i.e., in the first direction) are set larger than the molding cavities for forming the rack teeth located closer to the middle of the rack shaft in the length direction of the rack shaft (i.e., in the first direction). The molding cavities for forming the rack teeth are designed such that the pressure angle and the profile shift of the rack teeth are larger at a location closer to the corresponding end of the rack shaft than at a location closer to the middle of the rack shaft in the length direction of the rack shaft (i.e., in the first direction).

Using the mold designed in this manner allows the filling rate of a molding material into the molding cavities for forming the rack teeth located closer to the corresponding end of the rack shaft in the length direction of the rack shaft (i.e., in the first direction) to be less than the filling rate of a molding material into the molding cavities for forming the rack teeth located closer to the middle of the rack shaft in the length direction of the rack shaft (i.e., in the first direction). Accordingly, the rack teeth are formed such that the clearance defined between the rack guide and the guide plug has substantially the same size between when the pinion meshes with the rack teeth located closer to the middle of the rack shaft in the length direction of the rack shaft (i.e., in the first direction) and when the pinion meshes with the rack teeth located closer to the corresponding end of the rack shaft in the length direction of the rack shaft (i.e., in the first direction). Thus, when the pinion meshes with one of the third rack and the fifth rack, the size of the clearance is substantially constant, regardless of where the pinion is positioned.

In the steering system, the profile shift of the rack teeth refers to the amount of change in a reference line of the rack (i.e., the amount of change in the reference line in a direction that the rack teeth protrude in). The reference line of the rack is a straight line passing through a point of contact between the rack teeth and the pinion teeth and extending parallel to a tooth tip of the rack teeth or a tooth root formed between the rack teeth. Further, the reference line is a straight line that touches a reference circle of the pinion.

In the steering system, the pressure angle of the rack teeth refers to the angle formed between the tooth flank of the rack teeth and a straight line perpendicular to the reference line of the rack.

An embodiment of the invention is described below with reference to the drawings. The same or like reference characters will be used throughout the drawings to refer to the same or like parts, and their description will not be repeated.

Figure 1:
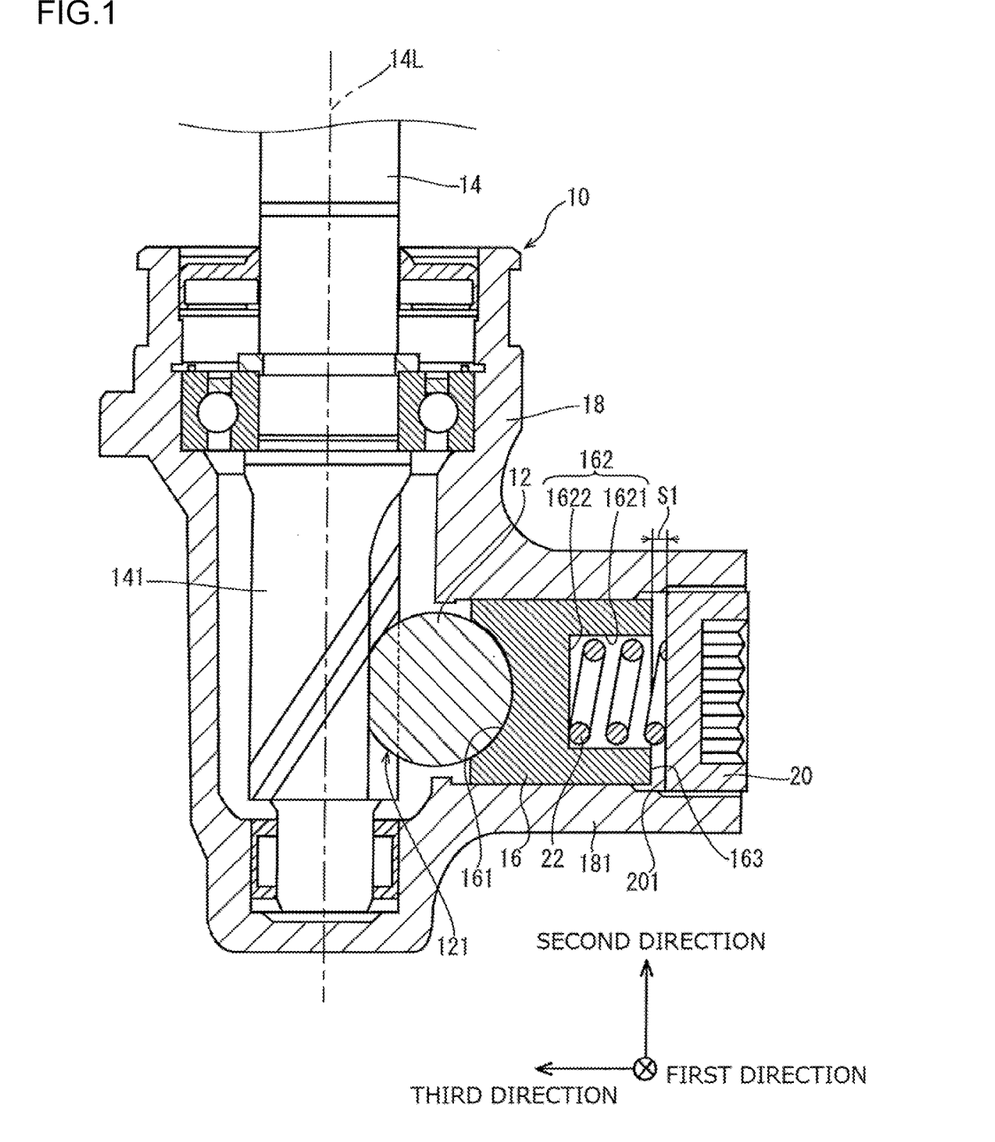
FIG. 1 is a cross-sectional view illustrating the schematic structure of a steering system according to an embodiment of the invention.

FIG. 1 illustrates a cross-sectional view illustrating the schematic structure of a steering system 10 according to the embodiment of the invention. The steering system 10 includes a rack shaft 12, a pinion shaft 14, a rack guide 16, a housing 18, a guide plug 20, and a coil spring 22 that serves as a biasing member.

In the description below, a first direction refers to a direction that the rack shaft 12 extends in, a second direction refers to a direction that the pinion shaft 14 extends in, and a third direction refers to a direction perpendicular to each of the first direction and the second direction.

Figure 2:
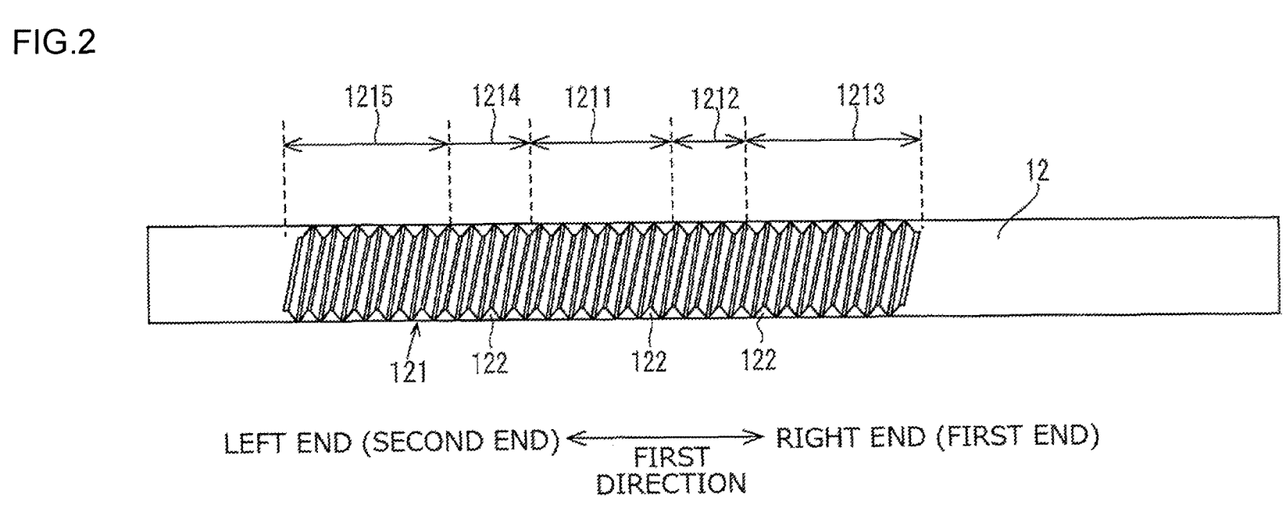
FIG. 2 is a plan view of a rack shaft.

The rack shaft 12 is described with reference to FIG. 2. FIG. 2 is a plan view of the rack shaft 12.

The rack shaft 12 has a rack 121. The rack shaft 12 has opposite first and second ends in the first direction. The rack 121 has multiple rack teeth 122. The rack teeth 122 are aligned in the first direction.

The rack 121 includes a first rack 1211, a second rack 1212, a third rack 1213, a fourth rack 1214, and a fifth rack 1215. These are described below.

The first rack 1211 is formed in a middle portion of the rack 121 in the first direction. The first rack 1211 includes a predetermined number of the rack teeth 122 that are adjacent to each other in the first direction.

The second rack 1212 is located closer to the right end (i.e., the first end) of the rack shaft 12 than the first rack 1211 in the first direction. The second rack 1212 is formed next to the first rack 1211. The second rack 1212 includes a predetermined number of the rack teeth 122 that are adjacent to each other in the first direction.

The third rack 1213 is located closer to the right end (i.e., the first end) of the rack shaft 12 than the second rack 1212. The third rack 1213 is formed next to the second rack 1212. The third rack 1213 includes a predetermined number of the rack teeth 122 that are adjacent to each other in the first direction.

The fourth rack 1214 is located closer to the left end (i.e., the second end) of the rack shaft 12 than the first rack 1211. The fourth rack 1214 is formed next to the first rack 1211. The fourth rack 1214 includes a predetermined number of the rack teeth 122 that are adjacent to each other in the first direction.

The fifth rack 1215 is located closer to the left end (i.e., the second end) of the rack shaft 12 than the fourth rack 1214. The fifth rack 1215 is formed next to the fourth rack 1214. The fifth rack 1215 includes a predetermined number of the rack teeth 122 that are adjacent to each other in the first direction.

Figure 3:
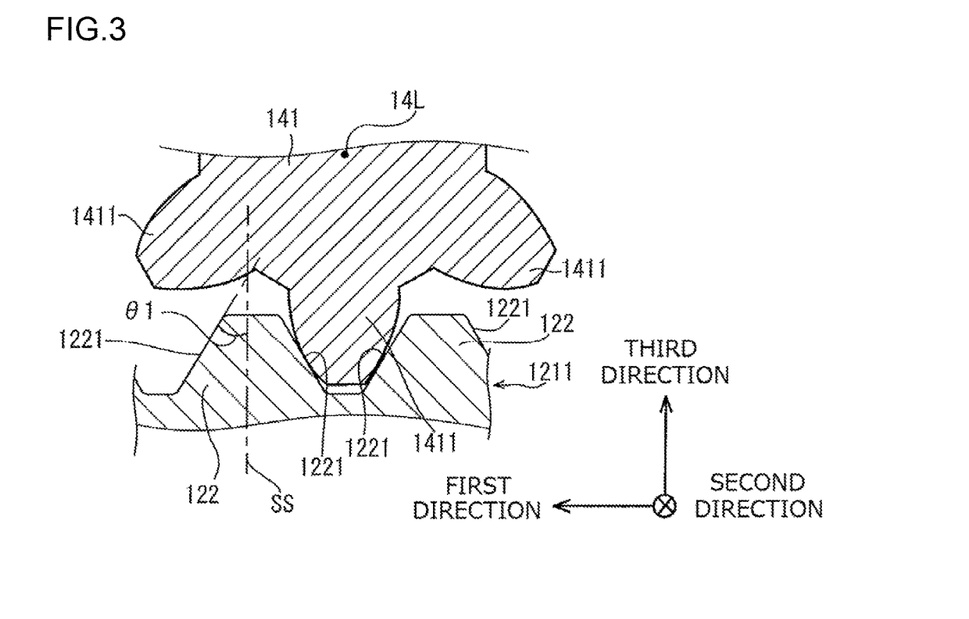
FIG. 3 is a cross-sectional view illustrating rack teeth of a first rack.
Figure 4:
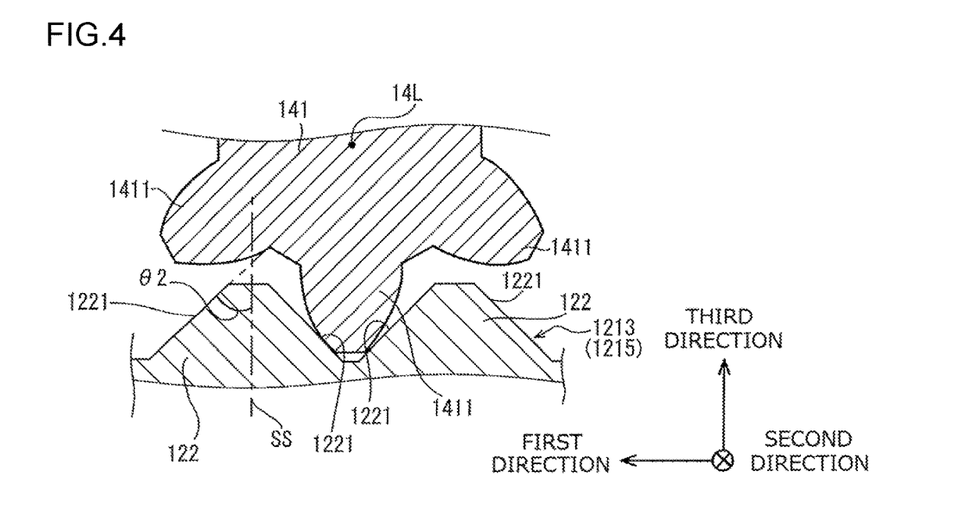
FIG. 4 is a cross-sectional view illustrating rack teeth of a fifth rack.

The rack teeth 122 are described with reference to FIG. 3 and FIG. 4. FIG. 3 is a cross-sectional view illustrating the rack teeth 122 of the first rack 1211; FIG. 4 is a cross-sectional view illustrating the rack teeth 122 of each of the third rack 1213 and the fifth rack 1215.

The rack teeth 122 each have a pair of tooth flanks 1221. Each of the pair of tooth flanks 1221 is oblique with respect to a reference plane SS that extends in the height direction of the rack teeth 122. An oblique angle of the tooth flanks 1221 with respect to the reference plane SS is a pressure angle.

As can be seen by comparing FIG. 3 and FIG. 4, a pressure angle θ1 of the rack teeth 122 of the first rack 1211 is smaller than a pressure angle θ2 of the rack teeth 122 of each of the third rack 1213 and the fifth rack 1215. In other words, a pitch of the rack teeth 122 of the first rack 1211 is smaller than a pitch of the rack teeth 122 of each of the third rack 1213 and the fifth rack 1215.

Referring back to FIG. 1, the description is continued. The pinion shaft 14 is placed to be rotatable in a circumferential direction around a central axis 14L extending in the second direction. The pinion shaft 14 is coupled to a steering wheel via parts including a steering shaft. When the steering wheel is turned, the turn is transferred to the pinion shaft 14 via the parts including the steering shaft.

The pinion shaft 14 has a pinion 141. As illustrated in FIG. 3 and FIG. 4, the pinion 141 has pinion teeth 1411. The pinion teeth 1411 extend in a helical manner in the axial direction of the pinion 141. In short, the pinion 141 is a helical pinion.

The pinion 141 meshes with the rack 121. As illustrated in FIG. 3 and FIG. 4, with the pinion 141 meshing with the rack 121, one of the pinion teeth 1411 is inserted between two of the rack teeth 122. Specifically, the pinion tooth 1411 is located between the left tooth flank 1221 of one of the two rack teeth 122 that is located to the right side of the pinion tooth 1411 and the right tooth flank 1221 of the other of the two rack teeth 122 that is located to the left side of the pinion tooth 1411. The pinion tooth 1411 touches at least one of the left and right tooth flanks 1221.

Referring back to FIG. 1, the description is continued. The first end of the pinion shaft 14 is accommodated in the housing 18. The housing 18 has a tubular portion 181. The tubular portion 181 has a hollow cylindrical shape extending in the third direction. The rack guide 16 is accommodated in the tubular portion 181.

As a whole, the rack guide 16 has a cylindrical shape extending in the third direction. A recess 161 is formed in a left end surface of the rack guide 16. The recess 161 has a shape corresponding to the rack shaft 12. The rack guide 16 touches the rack shaft 12 in the third direction. The rack shaft 12 is inserted in the recess 161 of the rack guide 16 while touching the rack guide 16 in the third direction. Thus, the rack shaft 12 touches the inner surface of the recess 161.

The guide plug 20 is a circular plate having a thickness in the third direction. The guide plug 20 is fixed to the tubular portion 181 inside the tubular portion 181. A screw thread formed on the outer circumferential surface of the guide plug 20 meshes with a screw groove formed on the inner circumferential surface of the tubular portion 181.

The guide plug 20 is located opposite the rack shaft 12 across the rack guide 16 in the third direction. A clearance S1 is defined between the rack guide 16 and the guide plug 20 in the third direction. The clearance S1 is a distance from a right end surface 163 of the rack guide 16 to a left end surface 201 of the guide plug 20.

The right end surface 163 of the rack guide 16 is a plane extending in a direction perpendicular to the third direction. The left end surface 201 of the guide plug 20 is a plane extending in the direction perpendicular to the third direction. Therefore, the right end surface 163 of the rack guide 16 is parallel to the left end surface 201 of the guide plug 20.

The coil spring 22 is located between the rack guide 16 and the guide plug 20 in the third direction. Specifically, the coil spring 22 is inserted in a recess 162 in the right end surface 163 of the rack guide 16. The recess 162 has an inner circumferential surface 1621 and an end surface 1622. The inner circumferential surface 1621 defines a tubular shape extending in the third direction. The end surface 1622 is joined to the left end of the inner circumferential surface 1621. The end surface 1622 is a plane extending in the direction perpendicular to the third direction. The end surface 1622 is parallel to the left end surface 201 of the guide plug 20.

The coil spring 22 touches the end surface 1622 in the third direction. The coil spring 22 touches the left end surface 201 in the third direction. Thus, the coil spring 22 is located between the end surface 1622 and the left end surface 201 in the third direction. Under this condition, the coil spring 22 is compressed in the third direction. The coil spring 22 provides the rack guide 16 with a biasing force that presses the rack guide 16 against the rack shaft 12. The biasing force provided by the coil spring 22 changes in accordance with size of the clearance S1. Specifically, as the clearance S1 becomes smaller, the coil spring 22 is further compressed in the third direction. Accordingly, the biasing force provided by the coil spring 22 increases.

In the steering system 10, when the pinion shaft 14 rotates in one of two opposite directions along the circumferential direction, the rack shaft 12 moves in one of two opposite directions along the first direction. When the pinion shaft 14 rotates in the other of the two opposite directions along the circumferential direction, the rack shaft 12 moves in the other of the two opposite directions along the first direction.

Figure 5:
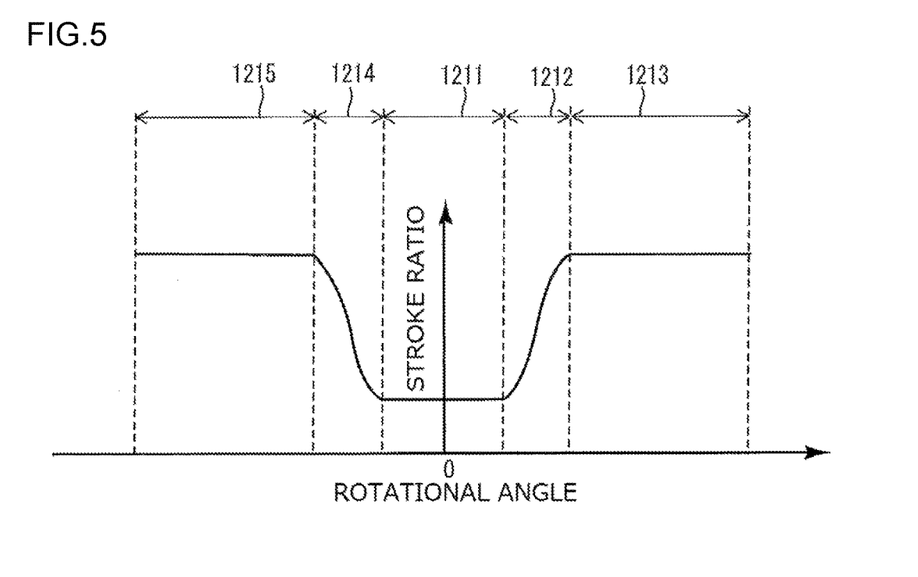
FIG. 5 is a graph illustrating a relationship between a rotational angle of a pinion shaft and a stroke ratio.

A stroke ratio is described with reference to FIG. 5. FIG. 5 is a graph illustrating a relationship between a rotational angle of the pinion shaft 14 in the circumferential direction and the stroke ratio. The stroke ratio here refers to a ratio of the distance by which the rack shaft 12 moves in the first direction relative to the angle by which the pinion shaft 14 rotates in the circumferential direction.

In the steering system 10, the stroke ratio is larger when the pinion 141 meshes with one of the third rack 1213 and the fifth rack 1215 than when the pinion 141 meshes with the first rack 1211. The stroke ratio changes while the pinion 141 moves on one of the second rack 1212 and the fourth rack 1214. Specifically, the stroke ratio gradually increases as the pinion 141 moves on the second rack 1212 toward the third rack 1213 and also as the pinion 141 moves on the fourth rack 1214 toward the fifth rack 1215.

Figure 6:
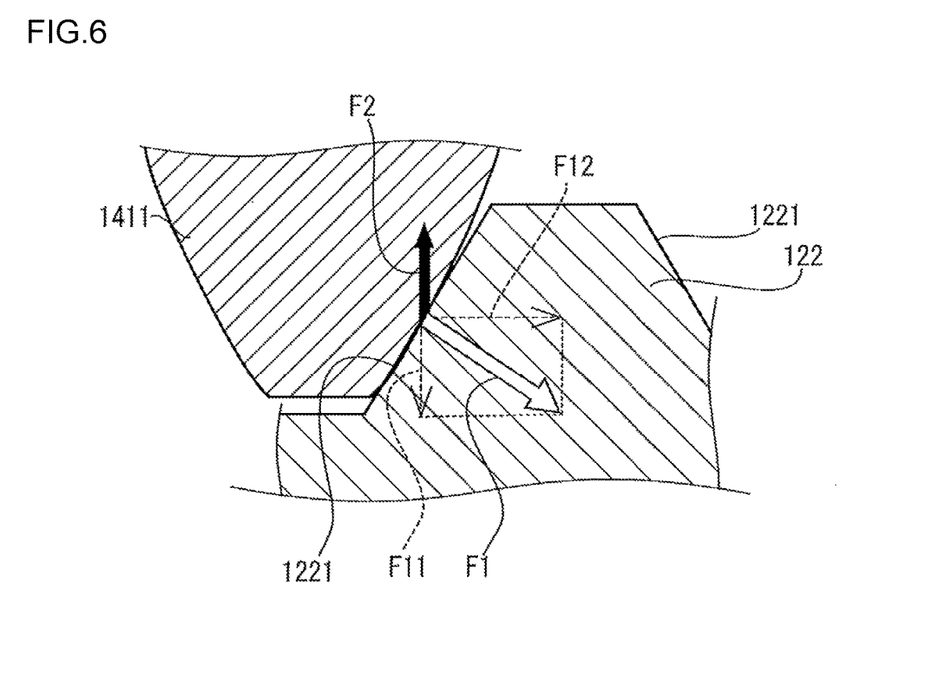
FIG. 6 is a diagram for explaining a force from the pinion and a force from a coil spring.

As illustrated in FIG. 6, when the pinion 141 meshes with the rack 121, the pinion tooth 1411 of the pinion 141 touches the tooth flank 1221 of the rack teeth 122. A force F1 from the pinion tooth 1411 acts perpendicularly to the tooth flank 1221. A biasing force F2 provided by the coil spring 22 acts in the height direction of the rack teeth 122 (i.e., in the third direction). The biasing force F2 provided by the coil spring 22 acts as a resistive force to interfere with rotation of the pinion 141. Setting the magnitude of a component F11 of the force F1 from the pinion 141 in a direction in which the biasing force F2 provided by the coil spring 22 acts equal to the magnitude of the biasing force F2 provided by the coil spring 22 allows the pinion 141 to rotate. It is noted that a component F12 of the force F1 from the pinion 141 in a direction perpendicular to the direction in which the biasing force F2 provided by the coil spring 22 acts is a force for moving the rack shaft 12 in the first direction.

The magnitude of the component F11 of the force F1 from the pinion 141 in the direction in which the biasing force F2 provided by the coil spring 22 acts changes in accordance with the pressure angle of the rack teeth 122. Therefore, in order to set the magnitude of the component F11 of the force F1 from the pinion 141 in the direction in which the biasing force F2 provided by the coil spring 22 acts equal to the magnitude of the biasing force F2 provided by the coil spring 22, it is necessary to change the magnitude of the force F1 from the pinion 141 in accordance with the pressure angle of the rack teeth 122. In other words, a torque required when the pinion 141 starts rotating changes in accordance with the pressure angle of the rack teeth 122.

There is a relationship between the pressure angle of the rack teeth 122 and the stroke ratio. Specifically, when the stroke ratio is small, the pressure angle of the rack teeth 122 is small as illustrated in FIG. 3. When the stroke ratio is large, the pressure angle of the rack teeth 122 is large as illustrated in FIG. 4.

When the stroke ratio is set in a manner illustrated in FIG. 5, the rack teeth 122 of the rack 121 have different pressure angles. Thus, the torque required when the pinion 141 starts rotating changes in accordance with where the pinion 141 is positioned relative to the rack 121 in the first direction when the pinion 141 starts rotating. Accordingly, a force (an initial operating force) required to start operating the steering wheel changes in accordance with where the steering wheel is positioned (i.e., in accordance with how much angle the steering wheel is turned from its initial position) when the steering wheel starts to be operated.

Figure 7:
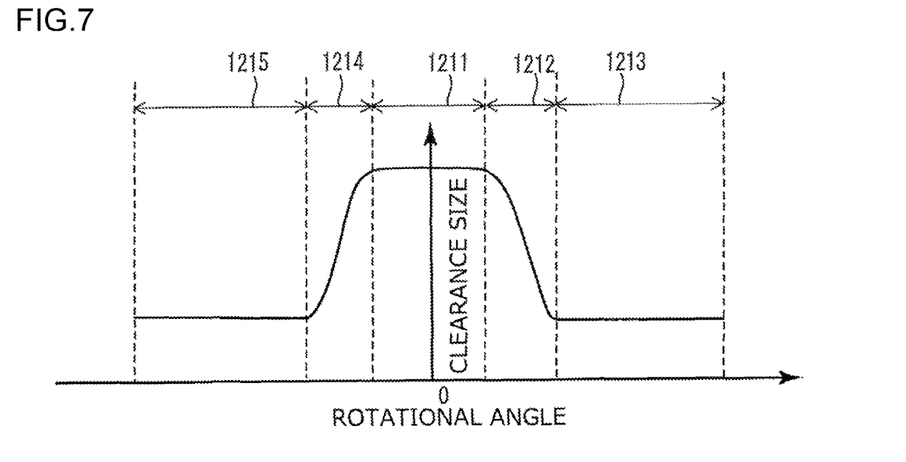
FIG. 7 is a graph illustrating a relationship between the rotational angle of the pinion shaft and a clearance defined between a rack guide and a guide plug.

In the steering system 10, as illustrated in FIG. 7, the clearance S1 defined between the rack guide 16 and the guide plug 20 is smaller when the pinion 141 meshes with one of the third rack 1213 and the fifth rack 1215 than when the pinion 141 meshes with the first rack 1211. The clearance S1 changes while the pinion 141 moves on one of the second rack 1212 and the fourth rack 1214. Specifically, the clearance S1 gradually becomes smaller as the pinion 141 moves on the second rack 1212 toward the third rack 1213 and also as the pinion 141 moves on the fourth rack 1214 toward the fifth rack 1215.

For example, causing the rack teeth 122 to have different heights or causing a portion of the rack shaft 12 where the rack teeth 122 are formed to have different thicknesses makes it possible to allow the clearance S1 to change in a manner described above.

In the steering system 10, the biasing force provided by the coil spring 22 changes in accordance with size of the clearance S1. Specifically, as the clearance S1 becomes smaller, the biasing force increases.

The clearance S1 is smaller when the pinion 141 meshes with one of the third rack 1213 and the fifth rack 1215 than when the pinion 141 meshes with the first rack 1211. Accordingly, the biasing force provided by the coil spring 22 is larger when the pinion 141 meshes with one of the third rack 1213 and the fifth rack 1215 than when the pinion 141 meshes with the first rack 1211.

The stroke ratio is larger when the pinion 141 meshes with one of the third rack 1213 and the fifth rack 1215 than when the pinion 141 meshes with the first rack 1211. In other words, the pressure angle of the rack teeth 122 of the first rack 1211 is smaller than the pressure angle of the rack teeth 122 of each of the third rack 1213 and the fifth rack 1215.

The pressure angle of the rack teeth 122 has an influence on the torque required when the pinion 141 starts rotating. This is because, in order to set the magnitude of the component F11 of the force F1 from the pinion 141 in the direction in which the biasing force F2 provided by the coil spring 22 acts equal to the magnitude of the biasing force F2 provided by the coil spring 22, it is necessary to adjust the force F1 from the pinion 141 in accordance with the pressure angle of the rack teeth 122.

In the steering system 10, when the pinion 141 meshes with the first rack 1211, i.e., when the pressure angle of the rack teeth 122 is small, the biasing force F2 provided by the coil spring 22 is small. The magnitude of the component F11 of the force F1 from the pinion 141 in the direction in which the biasing force F2 provided by the coil spring 22 acts is set equal to the magnitude of the biasing force F2 provided by the coil spring 22. Accordingly, the force F1 from the pinion 141 becomes small. Thus, the torque required when the pinion 141 starts rotating becomes small.

In the steering system 10, when the pinion 141 meshes with one of the third rack 1213 and the fifth rack 1215, i.e., when the pressure angle of the rack teeth 122 is large, the biasing force F2 provided by the coil spring 22 is large. The magnitude of the component F11 of the force F1 from the pinion 141 in the direction in which the biasing force F2 provided by the coil spring 22 acts is set equal to the magnitude of the biasing force F2 provided by the coil spring 22. Accordingly, the force F1 from the pinion 141 becomes large. Thus, the torque required when the pinion 141 starts rotating becomes large. The pressure angle of the rack teeth 122 and the biasing force F2 provided by the coil spring 22 are set as appropriate. This makes a torque required when the pinion 141 meshing with one of the third rack 1213 and the fifth rack 1215 starts rotating substantially equal to a torque required when the pinion 141 meshing with the first rack 1211 starts rotating.

In the steering system 10, when the pinion 141 meshes with one of the second rack 1212 and the fourth rack 1214, the stroke ratio changes in accordance with which portion of the one of the second rack 1212 and the fourth rack 1214 the pinion 141 meshes with. In other words, the pressure angle of the rack teeth 122 changes. The magnitude of the biasing force F2 of the coil spring 22 changes accordingly. The biasing force F2 of the coil spring 22 is set as appropriate in accordance with which portion of the rack 121 the pinion 141 meshes with. This makes the torque required when the pinion 141 meshing with one of the second rack 1212 and the fourth rack 1214 starts rotating substantially equal to the torque required when the pinion 141 meshing with one of the first rack 1211, the third rack 1213, and the fifth rack 1215 starts rotating.

Figure 8:
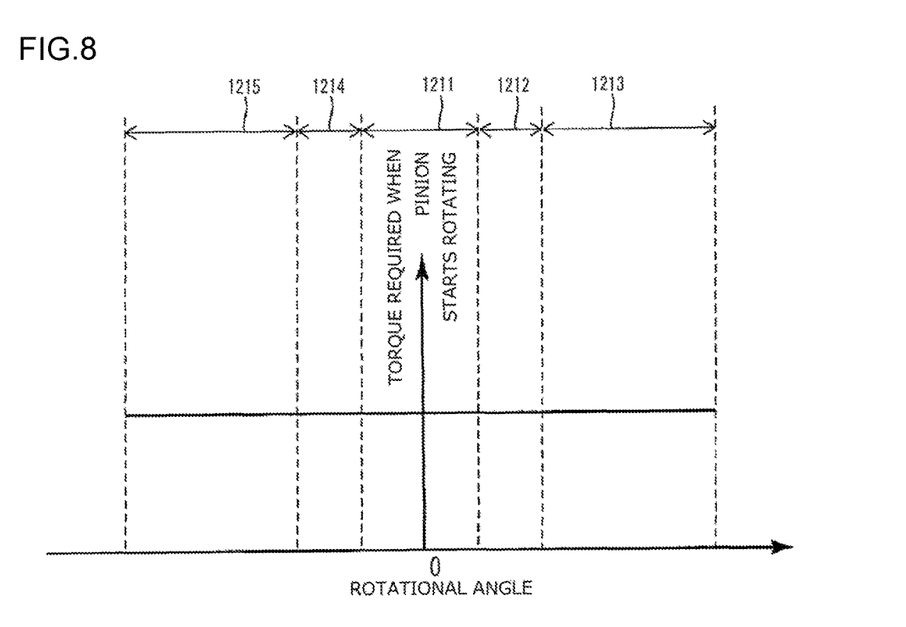
FIG. 8 is a graph illustrating a relationship between the rotational angle of the pinion shaft and a torque required when the pinion starts rotating.

Thus, as illustrated in FIG. 8, the steering system 10 makes it possible to substantially equalize the torque required when the pinion 141 starts rotating, regardless of which portion of the rack 121 the pinion 141 meshes with.

In the steering system 10, at the third rack 1213, the profile shift and the pressure angle of the rack teeth 122 are larger at a location closer to the right end (i.e., the first end) of the rack shaft 12 than at a location closer to the middle (i.e., the left end in FIG. 2, namely, the second end) of the rack shaft 12 in the first direction. Further, in the steering system 10, at the fifth rack 1215, the profile shift and the pressure angle of the rack teeth 122 are larger at a location closer to the left end (i.e., the second end) of the rack shaft 12 than at a location closer to the middle (i.e., the right end in FIG. 2, namely, the first end) of the rack shaft 12 in the first direction.

Figure 9:
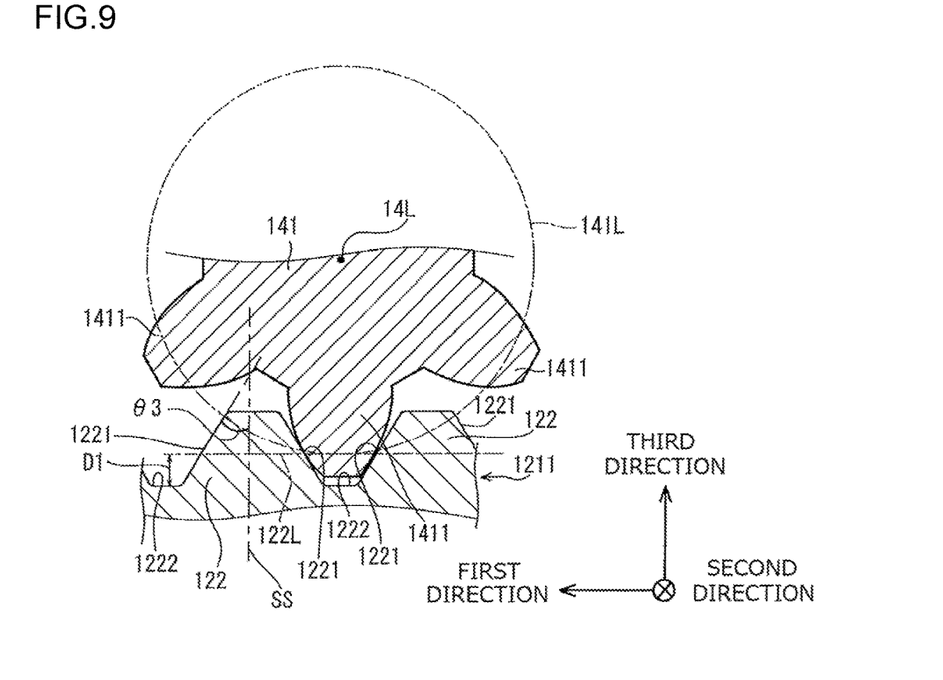
FIG. 9 is a cross-sectional view illustrating rack teeth of a third rack that are located closer to the middle of the rack shaft in the first direction.

The profile shift of the rack teeth 122 is described with reference to FIG. 9 and FIG. 10. FIG. 9 is a cross-sectional view illustrating the rack teeth 122 of the third rack 1213 that are located closer to the middle (i.e., the left end in FIG. 2, namely, the second end) of the rack shaft 12 in the first direction.

Figure 10:
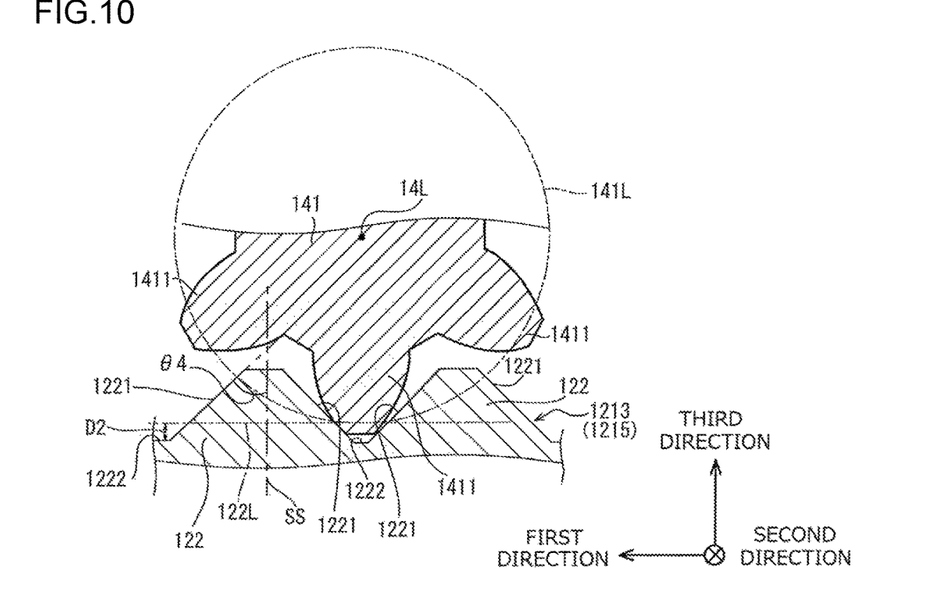
FIG. 10 is a cross-sectional view illustrating the rack teeth of the third rack that are located closer to an end of the rack shaft in the first direction.

FIG. 10 is a cross-sectional view illustrating the rack teeth 122 of the third rack 1213 that are located closer to the right end (i.e., the first end) of the rack shaft 12 in the first direction.

As illustrated in FIG. 9 and FIG. 10, a reference line 122L of the rack teeth 122 is a straight line passing through a point of contact between the rack teeth 122 and the pinion teeth 1411 and extending parallel to a tooth tip of the rack teeth 122 or a tooth root 1222 defined between the rack teeth 122. Further, the reference line 122L touches a reference circle 141L of the pinion 141.

As can be seen from FIG. 9 and FIG. 10, at the third rack 1213, a distance D1 between the reference line 122L of the rack teeth 122 located closer to the middle (i.e., the left end in FIG. 2, namely, the second end) of the rack shaft 12 and the tooth root 1222 in the first direction is larger than a distance D2 between the reference line 122L of the rack teeth 122 located closer to the right end (i.e., the first end) of the rack shaft 12 and the tooth root 1222 in the first direction. In other words, at the third rack 1213, the reference line 122L of the rack teeth 122 located closer to the middle (i.e., the left end in FIG. 2, namely, the second end) of the rack shaft 12 in the first direction is further away from the tooth root 1222 than the reference line 122L of the rack teeth 122 located closer to the right end (i.e., the first end) of the rack shaft 12 in the first direction. The amount of change in the reference line 122L described above (i.e., the amount of change in the reference line 122L in a direction that the rack teeth 122 protrude in, namely, the absolute value of the difference between the distance D1 and the distance D2) is defined as the profile shift of the rack teeth 122.

A pressure angle $\theta$ of the rack teeth 122 is descried with reference to FIG. 9 and FIG. 10. At the third rack 1213, a pressure angle $\theta 3$ of the rack teeth 122 located closer to the middle (i.e., the left end in FIG. 2, namely, the second end) of the rack shaft 12 in the first direction is smaller than a pressure angle $\theta 4$ of the rack teeth 122 located closer to the right end (i.e., the first end) of the rack shaft 12 in the first direction.

As described above, in the steering system 10, at each of the third rack 1213 and the fifth rack 1215, the profile shift and the pressure angle of the rack teeth 122 are larger at a location closer to the corresponding end of the rack shaft 12 than at a location closer to the middle of the rack shaft 12 in the first direction. Thus, at each of the third rack 1213 and the fifth rack 1215, the size of the clearance S1 is substantially constant, regardless of where the pinion 141 is positioned. The reason is as follows.

Figure 11:
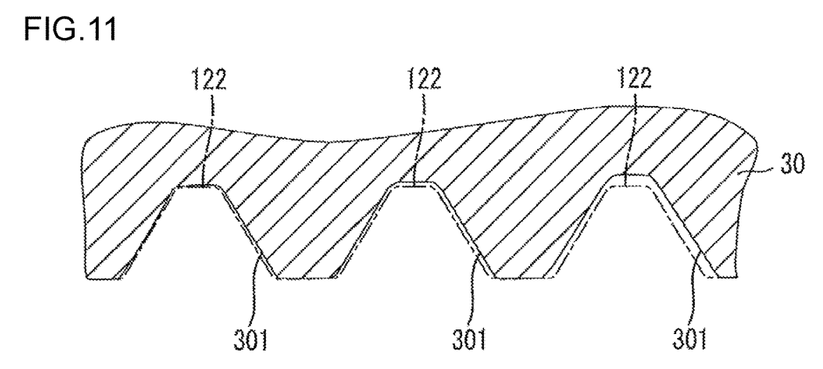
FIG. 11 is a cross-sectional view illustrating a mold used to manufacture the rack shaft and illustrating molding cavities used to form the rack teeth of the third rack.

The rack shaft 12 is manufactured, for example, by forging. A mold 30 illustrated in FIG. 11 is used to manufacture the rack shaft 12 by forging. FIG. 11 is a cross-sectional view illustrating the mold 30 used to manufacture the rack shaft 12 and illustrating molding cavities 301 used to form the rack teeth 122 of the third rack 1213. A long dashed short dashed line in FIG. 11 represents a target shape of the rack teeth 122.

When the rack shaft 12 is manufactured by forging, at the third rack 1213, the filling rate of a molding material into the molding cavities 301 is less at a location closer to the right end (i.e., the first end) of the rack shaft 12 than at a location closer to the middle (i.e., the left end in FIG. 2, namely, the second end) of the rack shaft 12 in the first direction. Accordingly, at the third rack 1213, the rack teeth 122 are smaller at a location closer to the right end (i.e., the first end) of the rack shaft 12 than at a location closer to the middle (i.e., the left end in FIG. 2, namely, the second end) of the rack shaft 12 in the first direction. As a result, at the third rack 1213, the clearance S1 is larger when the pinion 141 meshes with the rack teeth 122 located closer to the right end (i.e., the first end) of the rack shaft 12 in the first direction than when the pinion 141 meshes with the rack teeth 122 located closer to the middle (i.e., the left end in FIG. 2, namely, the second end) of the rack shaft 12 in the first direction.

Therefore, at a portion of the mold 30 corresponding to the third rack 1213, the molding cavities 301 for forming the rack teeth 122 located closer to the right end (i.e., the first end) of the rack shaft 12 in the first direction are set larger than the molding cavities 301 for forming the rack teeth 122 located closer to the middle (i.e., the left end in FIG. 2, namely, the second end) of the rack shaft 12 in the first direction. The molding cavities 301 are designed such that the pressure angle $\theta$ and the profile shift of the rack teeth 122 are larger at a location closer to the corresponding end of the rack shaft 12 than at a location closer to the middle of the rack shaft 12 in the first direction.

Using the mold 30 designed in this manner allows the filling rate of a molding material into the molding cavities 301 for forming the rack teeth 122 located closer to the corresponding end of the rack shaft 12 in the first direction to be less than the filling rate of a molding material into the molding cavities 301 for forming the rack teeth 122 located closer to the middle of the rack shaft 12 in the first direction. Accordingly, the rack teeth 122 is formed such that the clearance S1 has substantially the same size between when the pinion 141 meshes with the rack teeth 122 located closer to the middle of the rack shaft 12 in the first direction and when the pinion 141 meshes with the rack teeth 122 located closer to the end of the rack shaft 12 in the first direction. Thus, when the pinion 141 meshes with one of the third rack 1213 and the fifth rack 1215, the size of the clearance S1 is substantially constant, regardless of where the pinion 141 is positioned.

Although the invention has been described with reference to a particular embodiment, the embodiment is merely an example, and the invention is not limited in any way to the embodiment.

The steering system according to the embodiment of the invention makes it possible to equalize a torque required when a pinion meshing with a rack starts rotating in a rack-and-pinion steering system, regardless of which portion of the rack the pinion meshes with.

What is claimed is:
1. A steering system comprising:
   a rack shaft extending in a first direction and having opposite first and second ends in the first direction, the rack shaft including a rack having a plurality of rack teeth aligned in the first direction;
   a pinion shaft extending in a second direction intersecting with the first direction and having a pinion meshing with the rack;
   a rack guide touching the rack shaft in a third direction perpendicular to each of the first direction and the second direction;
   a housing accommodating the rack guide;
   a guide plug fixed to the housing and located opposite the rack shaft across the rack guide in the third direction; and
   a biasing member located between the rack guide and the guide plug and providing the rack guide with a biasing force that presses the rack guide against the rack shaft, wherein the rack guide and the guide plug define a clearance therebetween in the third direction, the biasing force increases as the clearance becomes smaller, the rack includes a first rack, a second rack, a third rack, a fourth rack, and a fifth rack, the first rack is formed in a middle portion of the rack in the first direction, the second rack is located closer to the first end of the rack shaft than the first rack in the first direction and is formed next to the first rack in the first direction, the third rack is located closer to the first end of the rack shaft than the second rack in the first direction and is formed next to the second rack in the first direction, the fourth rack is located closer to the second end of the rack shaft than the first rack in the first direction and is formed next to the first rack in the first direction, the fifth rack is located closer to the second end of the rack shaft than the fourth rack in the first direction and is formed next to the fourth rack in the first direction, when the pinion shaft rotates in one of two opposite directions along a circumferential direction around a central axis extending in the second direction, the rack shaft moves in one of two opposite directions along the first direction, when the pinion shaft rotates in the other of the two opposite directions along the circumferential direction, the rack shaft moves in the other of the two opposite directions along the first direction, a stroke ratio that is a ratio of a distance by which the rack shaft moves in the first direction relative to an angle by which the pinion shaft rotates in the circumferential direction is larger when the pinion meshes with one of the third rack and the fifth rack than when the pinion meshes with the first rack, the stroke ratio changes while the pinion moves on one of the second rack and the fourth rack, the clearance is smaller when the pinion meshes with one of the third rack and the fifth rack than when the pinion meshes with the first rack, and the clearance changes while the pinion moves on one of the second rack and the fourth rack.

2. The steering system according to claim 1, wherein the stroke ratio is constant while the pinion moves on the first rack.

3. The steering system according to claim 1, wherein the biasing member is a coil spring.

4. The steering system according to claim 1, wherein at each of the third rack and the fifth rack, a profile shift and a pressure angle of the plurality of rack teeth are larger at a location closer to a corresponding one of the opposite first and second ends of the rack shaft than at a location closer to a middle of the rack shaft.

* * * * *